United States Patent
McAllister, Jr. et al.

(10) Patent No.: US 8,114,491 B2
(45) Date of Patent: Feb. 14, 2012

(54) SHRINK SLEEVE LABEL

(75) Inventors: Larry B. McAllister, Jr., Spartanburg, SC (US); Slawomir Opuszko, Duncan, SC (US)

(73) Assignee: Cryovac, Inc., Duncan, SC (US)

( * ) Notice: Subject to any disclaimer, the term of this patent is extended or adjusted under 35 U.S.C. 154(b) by 1167 days.

(21) Appl. No.: 11/706,945

(22) Filed: Feb. 15, 2007

(65) Prior Publication Data

US 2008/0197540 A1    Aug. 21, 2008

(51) Int. Cl.
- B32B 27/00 (2006.01)
- B32B 27/36 (2006.01)
- B32B 27/32 (2006.01)

(52) U.S. Cl. ....... 428/35.2; 428/35.7; 428/480; 428/483

(58) Field of Classification Search .................. 428/483, 428/35.2, 35.7
See application file for complete search history.

(56) References Cited

U.S. PATENT DOCUMENTS

| | | | |
|---|---|---|---|
| 4,087,588 A * | 5/1978 | Shida et al. | 428/500 |
| 4,537,836 A * | 8/1985 | Adur et al. | 428/522 |
| 4,581,262 A | 4/1986 | Karabedian | |
| 4,585,679 A | 4/1986 | Karabedian | |
| 4,626,455 A | 12/1986 | Karabedian | |
| 4,938,683 A | 7/1990 | Boice | |
| 4,985,300 A | 1/1991 | Huang | |
| 5,217,812 A * | 6/1993 | Lee | 428/461 |
| 5,443,765 A * | 8/1995 | Yoshimura et al. | 264/488 |
| 5,534,606 A | 7/1996 | Bennett et al. | |
| 5,583,192 A | 12/1996 | Bennett et al. | |
| 5,648,443 A | 7/1997 | Okamoto et al. | |
| 5,658,625 A | 8/1997 | Bradfute et al. | |
| 5,859,116 A | 1/1999 | Shih | |
| 5,912,070 A * | 6/1999 | Miharu et al. | 428/214 |
| 6,406,763 B1 | 6/2002 | Wolf et al. | |
| 6,423,421 B1 | 7/2002 | Banaszak et al. | |
| 6,479,138 B1 | 11/2002 | Childress | |
| 6,627,273 B2 | 9/2003 | Wolf et al. | |
| 6,709,761 B2 | 3/2004 | Hirose et al. | |

(Continued)

FOREIGN PATENT DOCUMENTS

EP    1 388 559    2/2004

(Continued)

OTHER PUBLICATIONS

Film Properties of Plastics and Elastomers-A Guide to Non-Wovens in Packaging Applications 2nd Edition, ed. Massey, L.K., Plastics Design Library, p. 125-127, 2004.*

(Continued)

*Primary Examiner* — Rena Dye
*Assistant Examiner* — Michele L Jacobson
(74) *Attorney, Agent, or Firm* — Daniel B. Ruble

(57) ABSTRACT

A film comprises a skin layer, a base layer, and an intermediate layer between the skin and base layers. The skin layer comprises polyester. The base layer comprises styrenic block copolymer having a styrene monomer content of at least about 50 wt. %. The intermediate layer comprises: (i) one or more polymers selected from alpha-olefin/cyclic-olefin copolymer and alpha-olefin/vinyl aromatic copolymer and (ii) one or more polymers selected from ethylene/unsaturated ester copolymer and styrenic block copolymer having a styrene monomer content of at most about 50 wt. %. The film has a free shrink at 100° C. in at least one direction of at least about 10%. The film may be useful in shrink sleeve applications.

21 Claims, 1 Drawing Sheet

U.S. PATENT DOCUMENTS

| | | | |
|---|---|---|---|
| 6,743,523 B1 * | 6/2004 | Woo et al. | 428/516 |
| 6,852,806 B2 | 2/2005 | Sasagawa et al. | |
| 6,855,406 B2 | 2/2005 | Takayasu et al. | |
| 6,872,462 B2 | 3/2005 | Roberts et al. | |
| 7,160,604 B2 | 1/2007 | Ginossatis | |
| 7,211,306 B2 | 5/2007 | Peiffer et al. | |
| 7,645,505 B2 * | 1/2010 | Bekele et al. | 428/220 |
| 2002/0192412 A1 | 12/2002 | Satani et al. | |
| 2003/0039775 A1 | 2/2003 | Kong | |
| 2003/0068453 A1 | 4/2003 | Kong | |
| 2003/0152792 A1 | 8/2003 | Takayasu et al. | |
| 2004/0072002 A1 * | 4/2004 | Hashioka et al. | 428/515 |
| 2005/0100750 A1 | 5/2005 | Peiffer et al. | |
| 2005/0142313 A1 | 6/2005 | Grah | |
| 2005/0255196 A1 * | 11/2005 | Opuszko et al. | 426/106 |
| 2006/0019112 A1 * | 1/2006 | Holmes et al. | 428/500 |
| 2006/0105166 A1 | 5/2006 | Lischefski | |
| 2006/0251876 A1 * | 11/2006 | Goerlitz et al. | 428/220 |
| 2006/0275564 A1 | 12/2006 | Grah et al. | |
| 2006/0755564 | 12/2006 | Grah et al. | |
| 2007/0098933 A1 | 5/2007 | Opuszko et al. | |
| 2007/0172614 A1 * | 7/2007 | Lee | 428/35.7 |
| 2007/0254118 A1 * | 11/2007 | Opusko et al. | 428/34.9 |
| 2007/0275196 A1 * | 11/2007 | Opuszko | 428/35.2 |
| 2008/0026170 A1 | 1/2008 | Yamada et al. | |
| 2008/0075901 A1 * | 3/2008 | Lee et al. | 428/35.7 |
| 2008/0197540 A1 | 8/2008 | McAllister et al. | |
| 2009/0280341 A1 * | 11/2009 | Maruichi et al. | 428/483 |
| 2010/0075164 A1 * | 3/2010 | Bekele et al. | 428/474.9 |

FOREIGN PATENT DOCUMENTS

| | | |
|---|---|---|
| EP | 1 752 285 | 2/2007 |
| EP | 1 810 821 A1 | 7/2007 |
| EP | 1 810 822 A1 | 7/2007 |
| EP | 1 873 738 | 1/2008 |
| JP | 61-41543 | 2/1986 |
| JP | 1993-005659 B | 1/1993 |
| JP | 07-137212 | 5/1995 |
| JP | 2002-012731 | 1/2002 |
| JP | 2002215044 A | 7/2002 |
| JP | 2002-351332 | 12/2002 |
| JP | 2004025458 A | 1/2004 |
| JP | 2004181876 | 7/2004 |
| JP | 2004250469 A | 9/2004 |
| JP | 2005-119075 | 5/2005 |
| JP | 2005-131824 | 5/2005 |
| JP | 2005-313389 | 11/2005 |
| JP | 2006-21353 | 1/2006 |
| JP | 2006-159905 | 6/2006 |
| JP | 3845410 | 11/2006 |
| WO | WO 2005-102695 | 11/2005 |
| WO | WO 2006-051628 | 5/2006 |
| WO | WO 2006-051884 | 5/2006 |
| WO | WO 2006-051920 | 5/2006 |
| WO | WO 2006/114931 | 11/2006 |
| WO | WO 2007/058783 A1 | 5/2007 |

OTHER PUBLICATIONS

International Search Report and Written Opinion of the ISA mailed Jun. 25, 2008 for Int'l App. No. PCT/US2008/001923 (corresponds to U.S. Appl. No. 11/706,945).

Topas: Thermoplastic Olefin Polymer of Amorphous Structure, Product Brochure, pp. 1-20, Ticona Corporation (Sep. 2004).

Ticona website material, "Shrink Sleeves", http://www.ticona.com/ticona/index/markets/packaging/shrink_sleeves.htm (printed Aug. 3, 2005).

Ticona website material, "Topas Cyclic Olefin Copolymers (COC)", http://www.ticona.com/index/products/coc/topas.htm (printed Aug. 3, 2005).

N. Anyadike, "Stretching out: Flexible shrink sleeve labels provide stronger branding and tamper evidence," Brand vol. 2, No. 2, pp. 28-35 (Jan.-Feb. 2003).

Wiley Encyclopedia of Packaging Technology, 2nd ed., pp. 69-70 (John Wiley & Sons, Jan. 1997).

"Growth Shrinks . . . ," Flexible, vol. 2, No. 5, pp. 22-31 (Jan.-Feb. 2004).

BASF Corporation, Product Information Brochure, Styrolux 656C (Aug. 2005).

Eastman Corporation, Product Data Sheet, Eastar Copolyester 6763 (printed Aug. 3, 2005).

Eastman Corporation, "Application / Uses" Information Sheet, Eastar Copolyester 6763 (printed Aug. 3, 2005).

* cited by examiner

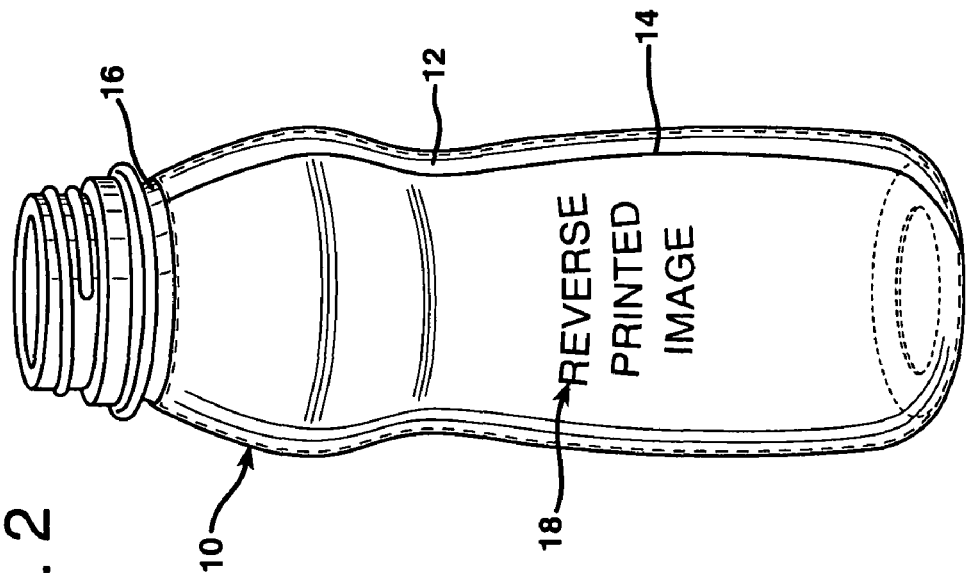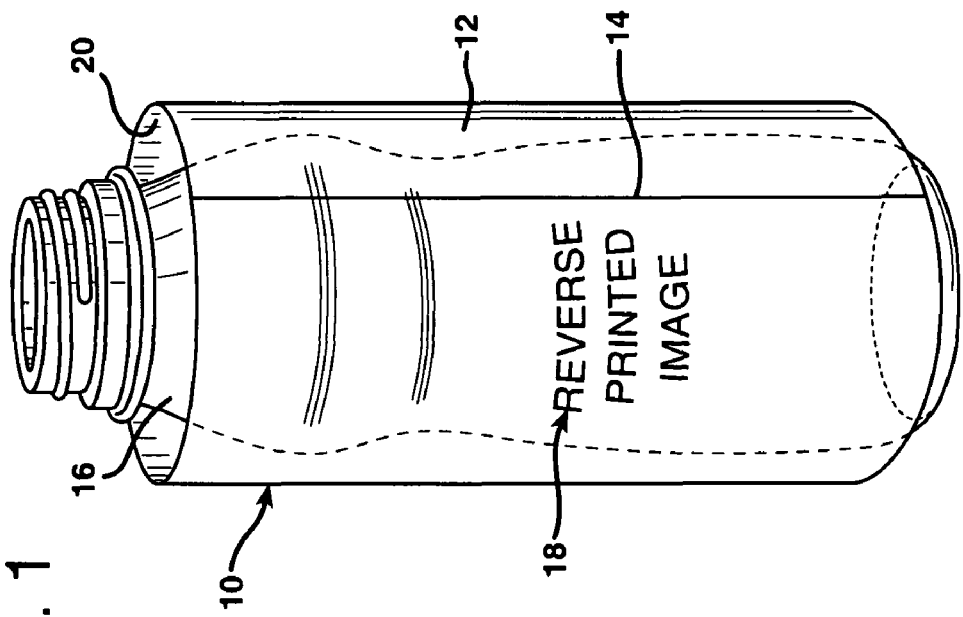

SHRINK SLEEVE LABEL

BACKGROUND

The present invention relates to a shrink film useful, for example, for manufacture of a shrink sleeve.

The shrink characteristic of a shrink sleeve may be activated, for example, by heating the shrink sleeve in a steam shrink tunnel or a hot air shrink tunnel. A shrink sleeve film would advantageously perform well using either type of shrink tunnel. The steam shrink tunnel provides for a higher heat transfer rate, and therefore is capable of higher throughput speeds. However, the moist environment of a steam shrink tunnel may contribute to interlayer delamination of some shrink films. A tie layer may be used to improve the interlayer bond strength; however, many tie layer polymers may undesirably contribute to a reduction of the Young's modulus (stiffness) of the film.

SUMMARY

One or more embodiments of present invention may address one or more of the aforementioned problems. In one embodiment, a film comprises a skin layer, a base layer, and an intermediate layer between the skin and base layers. The skin layer comprises polyester. The base layer comprises styrenic block copolymer having a styrene monomer content of at least about 50 wt. %. The intermediate layer comprises: (i) one or more polymers selected from alpha-olefin/cyclic-olefin copolymer and alpha-olefin/vinyl aromatic copolymer and (ii) one or more polymers selected from ethylene/unsaturated ester copolymer and styrenic block copolymer having a styrene monomer content of at most about 50 wt. %. The film has a free shrink at 100° C. in at least one direction of at least about 10%.

The invention will be more readily understood and appreciated by reference to the detailed description of the invention and the drawings.

BRIEF DESCRIPTION OF THE DRAWINGS

FIG. 1 is a representative perspective view of a shrink sleeve comprising an embodiment of the film of the present invention surrounding a container; and FIG. 2 is a representative perspective view of the shrink sleeve of FIG. 1 shrunk about the container to provide a shrink labeled container.

DETAILED DESCRIPTION

A film useful in shrink sleeve applications may comprise one or more of the following layers: a skin layer, a base layer, and an intermediate layer. These layers are discussed below.

The film may have a total thickness of at least about, and/or at most about, any of the following: 1, 1.6, 1.8, 2, 2.2, 3, 4, 5, 7, 9, 10, and 15 mils.

The film may comprise at least, and/or at most, any of the following numbers of layers: 2, 3, 4, 5, 6, 7, 8, 9, 10, 11, 13, and 15. As used herein, the term "layer" refers to a discrete film component which is substantially coextensive with the film and has a substantially uniform composition. Where two or more directly adjacent layers have essentially the same composition, then these two or more adjacent layers may be considered a single layer for the purposes of this application.

The film may have a density (at 23° C.) of at most about, and/or at least about, any of the following: 1.2, 1.15, 1.1, 1.05, and 1.0 grams/cubic centimeter. The density of the film is measured according to ASTM D792.

Below are some examples of combinations in which the alphabetical symbols designate the film layers. Where the multilayer film representation below includes the same letter more than once, each occurrence of the letter may represent the same composition or a different composition within the class that performs a similar function.

A/C/B, A/C/B/A, A/C/B/C/A, A/C/D/B, A/D/C/B, A/C/B/D, A/C/D/C/B, A/D/B/C/A, A/C/B/D/A, A/C/D/B, A/C/D/B/C/A, A/C/D/B/D/C/A, A/C/B/B/A, A/C/B/B/C/A, A/C/B/D/B/C/A

"A" represents a skin layer, as discussed herein.

"B" represents a base layer, as discussed herein.

"C" represents an intermediate layer (e.g., a tie layer), as discussed herein.

"D" represents one or more other layers of the film, such as a bulk layer.

The film may include recycled film material in any of the layers (e.g., in the base layer). For example, the film may include recycled film material in at least about, and/or at most about, any of the following amounts: 5, 10, 15, 20, 25, and 30% by weight of the layer comprising the recycled film material.

Skin Layer

The film may comprise at least one skin layer forming an outer surface of the film. A skin layer is an "outer layer" of the film, that is, a layer that has only one side directly adhered to another layer of the film. For multilayered films, there inherently exists two outer layers of the film. An "outside layer" is an outer layer of the film that is, or is intended to be, facing outwardly from a label or package comprising the film. An "inside layer" of a film is an outer layer of the film that is, or is intended to be, facing inwardly from a label comprising the film (i.e., toward the labeled item) or from a package comprising the film (i.e., toward the package interior space).

In addition to a first skin layer, the film may comprise a second skin layer as an outer layer of the film. The composition, thickness, and other characteristics of the first and second skin layers may be any of those described below with respect to the skin layer. Any of the composition, thickness, and other characteristics of the second skin layer may be substantially the same as any of those of the first skin layer, or may differ from any of those of the first skin layer.

The first and/or second skin layers may each have a thickness of at least about, and/or at most about, any of the following: 0.05, 0.1, 0.15, 0.2, 0.25, 0.5, 1, 2, 3, 4, and 5 mils. The thickness of a skin layer as a percentage of the total thickness of the film may be at least about, and/or at most about, any of the following: 1, 3, 5, 7, 10, 15, 20, 25, 30, 35, 40, 45, and 50 percent.

The first and/or second skin layers may each comprise one or more polyesters, such as any of the polyesters described herein, such as modified polyester (e.g., glycol-modified polyester and acid-modified polyester). A skin layer may comprise one or more of any of the below described polyesters, or one or more of any class of polyesters polymers, in at least about, and/or at most about, any of the following amounts: 40, 50, 60, 70, 80, 90, 95, and 100%, by weight of the layer.

Polyesters

Polyester includes polymers made by: 1) condensation of polyfunctional carboxylic acids with polyfunctional alcohols, 2) polycondensation of hydroxycarboxylic acid, and 3) polymerization of cyclic esters (e.g., lactone).

Exemplary polyfunctional carboxylic acids (which includes their derivatives such as anhydrides or simple esters like methyl esters) include aromatic dicarboxylic acids and derivatives (e.g., terephthalic acid, isophthalic acid, dimethyl terephthalate, dimethyl isophthalate, naphthalene-2,6-dicarboxylic acid;) and aliphatic dicarboxylic acids and derivatives (e.g., adipic acid, azelaic acid, sebacic acid, oxalic acid, succinic acid, glutaric acid, dodecanoic diacid, 1,4-cyclohexane dicarboxylic acid, dimethyl-1,4-cyclohexane dicarboxylate ester, dimethyl adipate). Representative dicarboxylic acids may be represented by the general formula:

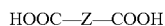

HOOC—Z—COOH where Z is representative of a divalent aliphatic radical containing at least 2 carbon atoms. Representative examples include adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid ("I") and terephthalic acid ("T"). As is known to those of skill in the art, polyesters may be produced using anhydrides and esters of polyfunctional carboxylic acids.

Exemplary polyfunctional alcohols include dihydric alcohols (and bisphenols) such as ethylene glycol, 1,2-propanediol, 1,3-propanediol, 1,3 butanediol, 1,4-butanediol, 1,4-cyclohexanedimethanol, 2,2-dimethyl-1,3-propanediol, 1,6-hexanediol, poly(tetrahydroxy-1,1'-biphenyl, 1,4-hydroquinone, bisphenol A, and cyclohexane dimethanol ("CHDM").

Exemplary hydroxycarboxylic acids and lactones include 4-hydroxybenzoic acid, 6-hydroxy-2-naphthoic acid, pivalolactone, and caprolactone.

Exemplary polyesters may be derived from lactone polymerization; these include, for example, polycaprolactone and polylactic acid.

The polyester may comprise or be modified polyester. Exemplary modified polyester includes glycol-modified polyester and acid-modified polyester. Modified polyesters are made by polymerization with more than one type of comonomer in order to disrupt the crystallinity and thus render the resulting polyester more amorphous.

A glycol-modified polyester is a polyester derived by the condensation of at least one polyfunctional carboxylic acid with at least two types of polyfunctional alcohols. For example, glycol-modified poly(ethylene terephthalate) or "PETG" may be made by condensing terephthalic acid with ethylene glycol and cyclohexane dimethanol ("CHDM"). A useful PETG is available from Eastman Corporation under the Eastar 6763 trade name, and is believed to have about 34 mole % CHDM monomer content, about 16 mole % ethylene glycol monomer content, and about 50 mole % terephthalic acid monomer content. Another useful glycol-modified polyester may be made similar to PETG, but substituting dimethyl terephthalate for the terephthalic acid component. Another exemplary glycol-modified polyester is available under the Ecdel 9965 trade name from Eastman Corporation, and is believed to have a density of 1.13 g/cc and a melting point of 195° C. and to be derived from dimethyl 1,4 cyclohexane-dicarboxylate, 1,4 cyclohexane-dimethanol, and poly(tetramethylene ether glycol).

Exemplary acid-modified polyester may be made by condensation of at least one polyfunctional alcohol with at least two types of polyfunctional carboxylic acids. For example, at least one of the polyfunctional alcohols listed above may be condensed with two or more of the polyfunctional carboxylic acids listed above (e.g., isophthalate acid, adipic acid, and/or Naphthalene-2,6-dicarboxylic acid). An exemplary acid-modified polyester may be derived from about 5 mole % isophthalic acid, about 45 mole % terephthalic acid, and about 50 mole % ethylene glycol, such as that available from Invista Corporation.

The polyester may be selected from random polymerized polyester or block polymerized polyester.

The polyester may be derived from one or more of any of the constituents discussed above. If the polyester includes a mer unit derived from terephthalic acid, then such mer content (mole %) of the diacid of the polyester may be at least about any the following: 70, 75, 80, 85, 90, and 95%.

The polyester may be thermoplastic. The polyester may be substantially amorphous, or may be partially crystalline (semi-crystalline). The polyester and/or the skin layer may have a crystallinity of at least about, and/or at most about, any of the following weight percentages: 5, 10, 15, 20, 25, 30, 35, 40, and 50%.

The crystallinity may be determined indirectly by the thermal analysis method, which uses heat-of-fusion measurements made by differential scanning calorimetry ("DSC"). All references to crystallinity percentages of a polymer, a polymer mixture, a resin, a film, or a layer in this Application are by the DSC thermal analysis method, unless otherwise noted. The DSC thermal analysis method is believed to be the most widely used method for estimating polymer crystallinity, and thus appropriate procedures are known to those of skill in the art. See, for example, "Crystallinity Determination," Encyclopedia of Polymer Science and Engineering, Volume 4, pages 482-520 (John Wiley & Sons, 1986), of which pages 482-520 are incorporated herein by reference.

Under the DSC thermal analysis method, the weight fraction degree of crystallinity (i.e., the "crystallinity" or "Wc") is defined as $\Delta H_f / \Delta H°_{f,c}$, where "$\Delta H_f$" is the measured heat of fusion for the sample (i.e., the area under the heat-flow versus temperature curve for the sample) and "$\Delta H°_{f,c}$" is the theoretical heat of fusion of a 100% crystalline sample. The $\Delta H°_{f,c}$ values for numerous polymers have been obtained by extrapolation methods; see for example, Table 1, page 487 of the "Crystallinity Determination" reference cited above. The $\Delta H°_{f,c}$ for polymers are known to, or obtainable by, those of skill in the art. The $\Delta H°_{f,c}$ for a sample polymer material may be based on a known $\Delta H°_{f,c}$ for the same or similar class of polymer material, as is known to those of skill in the art. For example, the $\Delta H°_{f,c}$ for polyethylene may be used in calculating the crystallinity of an EVA material, since it is believed that it is the polyethylene backbone of EVA rather than the vinyl acetate pendant portions of EVA, that forms crystals. Also by way of example, for a sample containing a blend of polymer materials, the $\Delta H°_{f,c}$ for the blend may be estimated using a weighted average of the appropriate $\Delta H°_{f,c}$ for each of the polymer materials of separate classes in the blend.

The DSC measurements may be made using a thermal gradient for the DSC of 10° C./minute. The sample size for the DSC may be from 5 to 20 mg.

Base Layer

The base layer may be an outer layer of the film; or the base layer may be an inner layer of the film. An "inner" layer is a layer that has both sides directly adhered to other layers of the film.

The base layer may have a thickness of at least about, and/or at most about, any of the following: 0.05, 0.1, 0.15, 0.2, 0.25, 0.5, 1, 2, 3, 4, 5, 8, 10, and 15 mils. The thickness of the base layer as a percentage of the total thickness of the film may be at least about, and/or at most about, any of the following: 10, 15, 20, 25, 30, 35, 40, 45, 50, 60, 70, and 80 percent.

The base layer may comprise: (i) styrenic block copolymer ("SBC") and optionally (ii) polystyrene having a styrene monomer content of at least about 90 wt. %.

Styrenic Block Copolymer

The base layer may comprise styrenic block copolymer ("SBC"). "Copolymer" as used in this application means a polymer derived from two or more types of monomers, and includes terpolymers, etc. Styrenic block copolymer includes: (i) styrene/conjugated diene/styrene block copolymers, for example styrene/butadiene/styrene copolymer ("SBS") and styrene/isoprene/styrene copolymer ("SIS"), (ii) styrene/ethylene-butylene/styrene copolymer ("SEBS"), (iii) styrene/ethylene-propylene/styrene ("SEPS"), (iv) styrene/ethylene-propylene copolymer ("SEP"), and (v) these polymers modified with unsaturated carboxylic acid anhydride.

The base layer may comprise SBC having a styrene monomer content of at least about, and/or at most about, any of the following: 50, 55, 60, 65, 70, 75, 80, 85, and 90 wt. %.

SBS may have a butadiene comonomer content of at most about any of the following: 30, 40, 50, 60, 65, 68, 70, 72, 75, 80, 85, 88, and 90 wt. %; and at least about any of the following: 27, 30, 35, 50, 60, 65, 68, 70, 72, 75, 80, and 85 wt. %, based on the weight of the SBS. The butadiene comonomer content may range between two or more ranges of the forgoing values, for example, from about 65 to about 75 wt. % and from about 30 to 65 wt. %.

SIS may have a isoprene comonomer content of at most about any of the following: 30, 40, 50, 60, 65, 68, 70, 72, 75, 80, 85, 88, and 90 wt. %; and at least about any of the following: 27, 30, 35, 50, 60, 65, 68, 70, 72, 75, 80, and 85 wt. %, based on the weight of the SIS. The isoprene comonomer content may range between two or more ranges of the forgoing values, for example, from about 65 to about 75 wt. % and from about 30 to 65 wt. %.

SBC (e.g., SBS, SIS) may comprise a substantially unsaturated elastomeric midblock such as a conjugated diene midblock (e.g., butadiene or isoprene comonomer midblock). These types of SBC are available from Kraton Polymers under the KRATON D trade name. For example, a linear SBS is available under the KRATON D2104 trade name (32% styrene content). SIS is also available from Kuraray Company under the HYBRAR trade name (e.g., HYBRAR 7125F).

SBC (e.g., SEBS, SEPS) may have a substantially saturated midblock. These types of SBC are available from Kraton Polymers under the KRATON G trade name. SEP, SEPS, and SEBS are also available from Kuraray Corporation under the SEPTON trade name.

SBC (e.g., SEBS, SEPS) may be modified (i.e., maleic anhydride grafted) as discussed in the "modified ethylene/unsaturated ester copolymer" section of this Application. Modified SBC (e.g., modified SEBS, modified SEPS) are available from Kraton Polymers under the KRATON FG trade name.

The base layer may comprise SBC (e.g., any one or more of any of the types of SBC discussed herein) in an amount of at least about any of the following: 30, 35, 40, 45, 50, 55, 60, 70, 75, 80, 85, 90, 95, 98, and 100 wt. %; and at most about any of the following: 100, 90, 80, 70, 60, 50, 45, 40, and 35 wt. %, based on the weight of the base layer. The base layer may consist of, or consist essentially of, SBC.

Exemplary SBC includes styrene/butadiene block copolymer available from BASF under the STYROLUX 656C and the STYROLUX BX6452 trade names and styrene/butadiene copolymer available from Amco Corporation under the AMALOY B1119 trade name believed to have a 75 mole % styrene content and a 25 mole % butadiene content).

Polystyrene

The base layer may comprise polystyrene having a styrene monomer content of at least about 90 wt. %, for example, at least about any of the following: 93, 95, 97, and 99 wt. %. The polystyrene may be any one of substantially atactic, syndiotactic, and/or isotactic. It is believed that the inclusion of such polystyrene may enhance the Young's modulus of the film. Processing aids—such as mineral oil, paraffin oil, naphthenic oil, waxes (e.g., erucacmide, oleamide, and bis-stearamide), silicone, and soybean oil—may be mixed with the polystyrene in an amount, for example, of from 1 to 5 wt parts processing aid to 100 weight parts polystyrene.

The base layer may comprise polystyrene having a styrene monomer content of at least about 90 wt. % (such as any of those described in this section) in at most about, and/or at least about, any of the following amounts: 0.5, 1, 3, 5, 8, 10, 13, 15, 18, 20, 23, and 25%, based on the weight of the base layer.

Intermediate Layer

The film may comprise one or more intermediate layers. In addition to a first intermediate layer, the film may comprise a second intermediate layer. The composition, thickness, and other characteristics of the first and second intermediate layers may be any of those described below with respect to the intermediate layer. Any of the composition, thickness, and other characteristics of the second intermediate layer may be substantially the same as any of those of the first intermediate layer, or may differ from any of those of the first intermediate layer.

An intermediate layer may be, for example, between the skin layer and the base layer. An intermediate layer may be directly adjacent the skin layer, so that there is no intervening layer between the intermediate and skin layers. An intermediate layer may be directly adjacent the base layer, so that there is no intervening layer between the intermediate and base layers. An intermediate layer may be directly adjacent both the skin layer and the base layer.

An intermediate layer may have a thickness of at least about, and/or at most about, any of the following: 0.05, 0.1, 0.15, 0.2, 0.25, 0.5, 1, 2, 3, 4, and 5 mils. The thickness of the intermediate layer as a percentage of the total thickness of the film may be at least about, and/or at most about, any of the following: 1, 3, 5, 7, 10, 15, 20, 25, 30, 35, 40, 45, and 50 percent.

An intermediate layer may comprise one or more of any of the tie polymers described herein in at least about, and/or at most about, any of the following amounts: 10, 20, 30, 40, 50, 60, 70, 75, 80, 90, 95, and 99.5%, by weight of the layer.

An intermediate layer may comprise one or more of any of the alpha-olefin/cyclic-olefin copolymers described herein in at least about, and/or at most about, any of the following amounts: 0.5, 1, 3, 5, 7, 10, 12, 15, 17, 20, 22, 25, 27, and 30%, by weight of the intermediate layer.

An intermediate layer may comprise one or more of any of the alpha-olefin/vinyl aromatic copolymers described herein in at least about, and/or at most about, any of the following amounts: 0.5, 1, 3, 5, 7, 10, 12, 15, 17, 20, 22, 25, 27, and 30%, by weight of the intermediate layer.

Tie Polymers

Useful tie polymers include thermoplastic polymers that may be compatible both with the polymer of one directly adjacent layer and the polymer of the other directly adjacent layer. Such dual compatibility enhances the adhesion of the tied layers to each other.

Exemplary tie polymers include: (i) ethylene/unsaturated ester copolymer and (ii) styrenic block copolymer having a styrene monomer content of at most about 50 wt %. These tie polymers are discussed below.

Ethylene/Unsaturated Ester Copolymer

The intermediate layer may comprise ethylene/unsaturated ester copolymer. Ethylene/unsaturated ester copolymer includes copolymers of ethylene and one or more unsaturated ester monomers. Useful unsaturated esters include:

1) vinyl esters of aliphatic carboxylic acids, where the esters have from 4 to 12 carbon atoms, 2) alkyl esters of acrylic or methacrylic acid (collectively, "alkyl(meth)acrylate"), where the esters have from 4 to 12 carbon atoms, and 3) glycidyl esters of acrylic or methacrylic acid (collectively, "gylcidyl(meth)acrylate"). The ethylene/unsaturated ester copolymer may comprise a mixture of the second and third types of comonomers, for example to form an ethylene/alkyl(meth)acrylate/gylcidyl(meth)acrylate copolymer.

Representative examples of the first ("vinyl ester") group of monomers include vinyl acetate, vinyl propionate, vinyl hexanoate, and vinyl 2-ethylhexanoate. The vinyl ester monomer may have at least any of the following number of carbon atoms: 4, 5, and 6 carbon atoms; and may have at most any of the following number of carbon atoms: 4, 5, 6, 8, 10, and 12 carbon atoms.

Representative examples of the second ("alkyl(meth)acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have at least any of the following number of carbon atoms: 4, 5, and 6 carbon atoms; and may have at most any of the following number of carbon atoms: 4, 5, 6, 8, 10, and 12 carbon atoms.

Representative examples of the third ("gylcidyl(meth)acrylate") group of monomers include gylcidyl acrylate and gylcidyl methacrylate ("GMA").

The ethylene/unsaturated ester copolymer may comprise (i) vinyl ester of aliphatic carboxylic acid comonomer content of any one or more of the above listed types of vinyl esters of aliphatic carboxylic acids and/or (ii) alkyl(meth)acrylate comonomer content of any one or more of the above listed types of alkyl(meth)acrylates in at least about any of the following amounts (based on the weight of the copolymer): 3, 5, 10, 15, 20, 22, 23, 24, 25, 26, 27, 28, 29, 30, 32, 34, 36, 38, 40, 45, 50, 55, and 60 wt. %; and at most about any of the following amounts (based on the weight of the copolymer): 10, 15, 20, 25, 26, 27, 28, 29, 30, 32, 34, 36, 38, 40, 45, 50, 55, 60, 65, 70, 75, and 80 wt. %.

The ethylene/unsaturated ester copolymer may comprise glycidyl(meth)acrylate comonomer content (e.g., any one or more of the above listed types of glycidyl(meth)acrylates) in at least about any of the following amounts (based on the weight of the copolymer): 0.5, 1, 2, 3, 4, 5, 6, 7, 8, 9, and 10 wt. %; and at most about any of the following amounts (based on the weight of the copolymer): 1, 2, 3, 4, 5, 6, 7, 8, 9, 10, and 12 wt. %.

The unsaturated ester comonomer content (e.g., the vinyl ester, alkyl (meth)acrylate, and/or gylcidyl(meth)acrylate comonomer content) of the ethylene/unsaturated ester copolymer may collectively total at least about any of the following amounts (based on the weight of the copolymer): 20, 22, 23, 25, 26, 27, 28, 29, 30, 32, 34, 36, 38, 40, 45, 50, 55, and 60 wt. %; and may collectively total at most about any of the following amounts (based on the weight of the copolymer): 30, 32, 34, 36, 38, 40, 45, 50, 55, 60, 65, 70, 75, and 80 wt. %.

The ethylene monomer content of the ethylene/unsaturated ester copolymer may be at least about, and/or at most about, any of the following (based on the weight of the copolymer): 45, 50, 55, 60, 65, 70, and 80 wt. %.

Representative examples of ethylene/unsaturated ester copolymers include:
ethylene/vinyl acetate,
ethylene/$C_1$-$C_{12}$ alkyl(meth)acrylate copolymers;
ethylene/methyl acrylate,
ethylene/methyl methacrylate,
ethylene/ethyl acrylate,
ethylene/ethyl methacrylate,
ethylene/butyl acrylate,
ethylene/2-ethylhexyl methacrylate,
ethylene/glycidyl acrylate,
ethylene/glycidyl methacrylate (e.g., that available from Arkema Corporation under the LOTADER 8840 trade name, believed to have 8 wt. % GMA monomer content),
ethylene/methyl acrylate/glycidyl acrylate,
ethylene/methyl methacrylate/glycidyl acrylate,
ethylene/ethyl acrylate/glycidyl acrylate,
ethylene/ethyl methacrylate/glycidyl acrylate,
ethylene/butyl acrylate/glycidyl acrylate,
ethylene/2-ethylhexyl methacrylate/glycidyl acrylate,
ethylene/methyl acrylate/glycidyl methacrylate (e.g., that available from Arkema Corporation under the LOTADER 8900 trade name, believed to have about 24 wt. % methyl acrylate monomer content and about 8 wt. % GMA monomer content),
ethylene/methyl methacrylate/glycidyl methacrylate,
ethylene/ethyl acrylate/glycidyl methacrylate,
ethylene/ethyl methacrylate/glycidyl methacrylate,
ethylene/butyl acrylate/glycidyl methacrylate (e.g., that available from Arkema Corporation under the LOTADER AX 8999 trade name, believed to have 28 wt. % butyl acrylate monomer content and 1 wt. % GMA monomer content), and
ethylene/2-ethylhexyl methacrylate/glycidyl methacrylate.

The intermediate layer may comprise ethylene/unsaturated ester copolymer (e.g., any one or more of any of the ethylene/unsaturated ester copolymers discussed in this Application) in an amount of at least about, and/or at most about, any of the following: 20, 25, 35, 40, 45, 50, 60, 70, 80, 90, 98, and 99.5 wt. %, based on the weight of the intermediate layer.

The intermediate layer may comprise unmodified ethylene/unsaturated ester copolymer (i.e., ethylene/unsaturated ester copolymer that is not modified as discussed below) in any of the amounts set forth in the previous paragraph.

Modified Ethylene/Unsaturated Ester Copolymer

The ethylene/unsaturated ester copolymer may comprise or be modified ethylene/unsaturated ester copolymer, so that the intermediate layer may comprise modified ethylene/unsaturated ester copolymer. Modified ethylene/unsaturated ester copolymer includes ethylene/unsaturated ester copolymers (i.e., any of the ethylene/unsaturated ester copolymers described in the previous section of this Application), which are modified (e.g., grafted) with unsaturated carboxylic acid anhydride (i.e., anhydride-modified polymer) to incorporate anhydride functionality. The modification may promote or enhance the adhesion characteristics of the copolymer. Examples of unsaturated carboxylic acid anhydrides include maleic anhydride, fumaric anhydride, and unsaturated fused ring carboxylic acid anhydrides (e.g., as described in U.S. Pat. No. 4,087,588).

Examples of modified ethylene/unsaturated ester copolymer include: maleic anhydride-grafted ethylene/vinyl acetate copolymer having a vinyl acetate comonomer content of about 25 wt. % available from DuPont Corporation under the BYNEL 3861 trademark; maleic anhydride modified ethylene/vinyl acetate copolymer having a vinyl acetate monomer content of about 28 wt. % available from DuPont Corporation under the FUSABOND MC250D trade name; and ethylene/alkyl acrylate/maleic anhydride copolymers, such as ethylene/ethyl acrylate/maleic anhydride copolymer containing 27.5 wt. % acrylate comonomer content and 2.9 wt/% maleic anhydride ("MAH") comonomer content; ethylene/ethyl acrylate/maleic anhydride copolymer containing 20% acrylate comonomer content and 3% MAH comonomer content; the LOTADER series of ethylene/alkyl acrylate/maleic anhydride interpolymers (Elf-Atochem, Inc.; Buffalo, N.Y.); maleic anhydride-grafted ethylene/methyl acrylate copolymer available from Dupont Corporation under the BYNEL 21E810 trade name; and ethylene/vinyl acetate/maleic anhydride terpolymer available under the OREVAC 9314 trade name (14% vinyl acetate and 1% maleic anhydride).

Useful anhydride-modified polymers may contain anhydride moiety in an amount (based on the weight of the modified polymer) of at least about, and/or at most about, any of the following: 0.1%, 0.5%, 1%, 2%, 4%, 5%, 8%, and 10%. The anhydride-modified polymer may be made by grafting or copolymerization.

The intermediate layer may comprise modified ethylene/unsaturated ester copolymer in an amount of at least about, and/or at most about, any of the following: 5, 10, 15, 20, 25, 30, 35, 40, 45, 50, 60, 70, 80, 90, 95, and 99.5 wt. %, based on the weight of the intermediate layer. The intermediate layer may comprise modified ethylene/unsaturated ester copolymer and unmodified ethylene/unsaturated ester copolymer totaling any of the amounts set forth in the previous sentence.

Styrenic Block Copolymer as Tie Polymer

The intermediate layer may comprise styrenic block copolymer ("SBC") having a styrene monomer content of at most about 50 wt. %. SBC is discussed above in conjunction with the base layer. The SBC useful for the intermediate layer may have a styrene monomer content of at most about, and/or at least about, any of the following: 50, 45, 40, 35, 32, 30, 28, 25, 20, 15, and 10 wt. %.

The SBC of the intermediate layer may be or comprise modified SBC, which is SBC modified (e.g., grafted) with unsaturated carboxylic acid anhydride (i.e., anhydride-modified polymer) to incorporate anhydride functionality. The modification may promote or enhance the adhesion characteristics of the copolymer. Useful anhydride-modified polymers may contain anhydride moiety in an amount (based on the weight of the modified polymer) of at least about, and/or at most about, any of the following: 0.1%, 0.5%, 1%, 2%, 4%, 5%, 8%, and 10%. The anhydride-modified polymer may be made by grafting or copolymerization.

The intermediate layer may comprise SBC (e.g., SBC having a styrene monomer content of at most about 50 wt. % or modified SBC having a styrene monomer content of at most about 50 wt. %) in an amount of at least about, and/or at most about, any of the following: 5, 10, 15, 20, 25, 30, 35, 40, 45, 50, 60, 70, 80, 90, 95, and 99.5 wt. %, based on the weight of the intermediate layer.

Alpha-Olefin/Cyclic-Olefin Copolymer

The intermediate layer may comprise alpha-olefin/cyclic-olefin copolymer ("COC"). COC is a copolymer that may be formed by polymerization of cyclic-olefin and alpha-olefin. A cyclic olefin is a compound containing a polymerizable carbon-carbon double bond that is either within an alicyclic ring (e.g., as in norbornene) or is linked to an alicyclic ring (e.g., as in vinyl cyclohexane). The COC may have a cyclic ring as part of the polymer backbone (e.g., ethylene/cyclopentene copolymer and ethylene/norbornene copolymer). The COC may have a cyclic ring pendant to the polymer backbone (e.g., ethylene/vinyl cyclohexane copolymer).

Exemplary COC may comprise (polymerized) cyclic-olefin content derived from one or more of cyclopentene, substituted cyclopentene, norbornene, substituted norbornene, cyclobutene, cyclopentene, methylcyclopentene, 5-vinylnorbornene, 5-methylnorbornene, 5-ethylidenorbornene, dicyclopentadiene, tetracyclododecene, and cyclododecatriene.

Useful COC may comprise cyclic-olefin content, such as any of those cyclic olefins identified above, in at least about, and/or at most about, any of the following mole %: 10, 15, 18, 20, 22, 24, 28, 30, 32, 35, 40, and 45.

Useful alpha-olefin of the COC may be linear or branched, and may have, for example, at least and/or at most any of the following number of carbon atoms: 2, 3, 4, 6, 8, 10, 14, 18, and 20. For example, the COC may comprise alpha-olefin content derived from one or more of ethylene and propylene. Useful COC may comprise alpha-olefin content (e.g., any of one or more the above described alpha-olefins) in at least about, and/or at most about, any of the following mole %: 90, 85, 80, 75, 70, 65, 60, and 55.

Exemplary COC includes ethylene/cyclic-olefin copolymer and propylene/cyclic-olefin copolymer. Useful COC includes ethylene/norbornene copolymer, ethylene/norbornene/octene copolymer, ethylene/norborne/butene copolymer, ethylene/norbornene/hexene copolymer, and propylene/norbornene copolymer.

The COC may be either heterogeneous or homogeneous. As is known in the art, heterogeneous polymers have a relatively wide variation in molecular weight and composition distribution. Heterogeneous polymers may be prepared with, for example, conventional Ziegler-Natta catalysts.

On the other hand, homogeneous polymers are typically prepared using metallocene or other single-site catalysts. Such single-site catalysts typically have only one type of catalytic site, which is believed to be the basis for the homogeneity of the polymers resulting from the polymerization. Homogeneous polymers are structurally different from heterogeneous polymers in that homogeneous polymers exhibit a relatively even sequencing of comonomers within a chain, a mirroring of sequence distribution in all chains, and a similarity of length of all chains. As a result, homogeneous polymers have relatively narrow molecular weight and composition distributions.

Exemplary homogeneous COC includes ethylene/norbornene copolymer available from Ticona Corporation under the Topas trademark, for example, Topas 9506X1 (believed to have a Tg of about 33° C.), Topas 9506 (believed to have a Tg of about 65° C.), Topas 8007 (believed to have a Tg of about 85° C.), Topas 6017 (believed to have a Tg of about 180° C.), Topas 6015 (believed to have a Tg of about 160° C.), Topas 6013 (believed to have a Tg of about 140° C.), and Topas 5013 (believed to have a Tg of about 135° C.), and ethylene/norbornene copolymer available from Mitusi Corporation under the APEL trade name.

Alpha-Olefin/Vinyl Aromatic Copolymers

The intermediate layer may comprise alpha-olefin/vinyl aromatic copolymer ("AO/VA"), which is a copolymer of alpha-olefin and vinyl aromatic monomers. The alpha-olefin of the AO/VA may be one or more of any of those discussed above with respect to COC. The vinyl aromatic compound of the AO/VA may be one or more of any of styrene, methylstyrene (e.g., p-methyl styrene), vinyl toluene, vinyl xylene, vinyl naphthalene, and vinyl anthracene. Exemplary AO/VA includes ethylene/styrene copolymer and ethylene/vinyl toluene copolymer.

The AO/VA may either be heterogeneous or homogeneous. The homogeneous and heterogeneous aspects of polymers are discussed herein in more detail in conjunction with COC.

The AO/VA may be a random polymer or a block polymer. The AO/VA may comprise vinyl aromatic content (e.g., any of one or more the above described vinyl aromatic compounds) in at least about, and/or at most about, any of the following weight %: 90, 85, 80, 75, 70, 65, 60, and 55. The AO/VA may comprise alpha-olefin content in at least about, and/or at most about, any of the following weight %: 5, 10, 15, 20, 25, 30, 35, 40, and 45.

Useful COC and/or AO/VA may each independently have a glass transition temperature ("Tg") of at least about, and/or at most about, any of the following: 25, 30, 35, 40, 45, 50, 55, and 60° C.

Unless specified otherwise, the Tg is measured at a relative humidity of 0%. All references to the glass transition temperature of a polymer, a polymer mixture, a resin, a film, or a layer in this Application refer to the characteristic temperature at which amorphous polymers, or the amorphous part of semi-crystalline polymers, of the sample changes from a hard, glassy, or brittle state to a soft, flexible, rubbery state, as measured by dynamic mechanical analysis ("DMA") according to ASTM D4065 and ASTM D5026, using a dynamic displacement frequency of 22 radians/second, an amplitude of displacement of 0.1% strain, a thermal gradient of 3° C./minute, and a nitrogen atmosphere, where the temperature is ramped from −150° C. up to the point of loss of transducer sensitivity (i.e., when the film falls apart). The Tg is the tan delta beta transition peak temperature averaged for two samples.

An intermediate layer may comprise COC (e.g., any of the above-identified COC) and/or may comprise AO/VA (e.g., any of the above-identified AO/VA) in at least about, and/or at most about, any of the following amounts, based on the weight of the intermediate layer: 0.5, 1, 3, 5, 7, 10, 12, 15, 17, 20, 22, 25, 27, and 30 weight %.

The intermediate layer may comprise a first COC selected from any of the COCs described above, and a second COC (different from the first COC), selected from any of the COCs described above. The intermediate layer may comprise the first COC in at least about, and/or at most about, any of the following amounts, based on the weight of the intermediate layer: 0.5, 1, 3, 5, 7, 10, 12, 15, 17, 20, 22, 25, 27, and 30 weight %. The intermediate layer may comprise the second COC in at least about, and/or at most about, any of the following amounts, based on the weight of the intermediate layer: 0.5, 1, 3, 5, 7, 10, 12, 15, 17, 20, 22, 25, 27, and 30 weight %.

The intermediate layer may comprise a first AO/VA selected from any of the AO/VAs described above, and a second AO/VA (different from the first AO/VA), selected from any of the AO/VAs described above. The intermediate layer may comprise the first AO/VA in at least about, and/or at most about, any of the following amounts, based on the weight of the intermediate layer: 0.5, 1, 3, 5, 7, 10, 12, 15, 17, 20, 22, 25, 27, and 30 weight %. The intermediate layer may comprise the second AO/VA in at least about, and/or at most about, any of the following amounts, based on the weight of the intermediate layer: 0.5, 1, 3, 5, 7, 10, 12, 15, 17, 20, 22, 25, 27, and 30 weight %.

Addititives

One or more layers of the film may include one or more additives useful in thermoplastic films, such as, antiblocking agents, slip agents, antifog agents, colorants, pigments, dyes, flavorants, antimicrobial agents, meat preservatives, antioxidants, fillers, radiation stabilizers, and antistatic agents.

Modulus of the Film

The film preferably exhibits a Young's modulus sufficient to withstand the expected handling and use conditions. Young's modulus may be measured in accordance with one or more of the following ASTM procedures: D882; D5026-95a; D4065-89, each of which is incorporated herein in its entirety by reference.

The film may have a Young's modulus of at least about, and/or at most about, any of the following: 60,000; 100,000; 130,000; 150,000; 200,000; 250,000; 300,000; 350,000; and 400,000 pounds/square inch, measured at a temperature of 73° F. The film may have any of the forgoing ranges of Young's modulus in at least one direction (e.g., in the machine direction or in the transverse direction) or in both directions (i.e., the machine (i.e., longitudinal) and the transverse directions).

Interlayer Bond Strength

The term "interlayer bond strength" of the film as used herein means the average amount of force required to separate or delaminate two adjacent film layers either by adhesive failure between the layers or by cohesive failure through one of the two adjacent film layers (whichever occurs first), as measured in accordance with ASTM F88 where the testing machine (e.g., Instron tensile tester) crosshead speed is 5 inches per minute, using five, 1-inch wide, representative samples and a test temperature of room temperature (i.e., about 68° F.), unless otherwise specified below. ASTM F88 is incorporated herein in its entirety by reference. To prepare a film sample for a test of the interlayer bond strength, a portion of the film may be separated at an interface between layers to provide specimen legs for insertion into the grips of the testing machine. For example, pressure-sensitive adhesive tape may be adhered to opposite outer sides of the film to leave a gripping tab of tape extending from each side of the film. The tabs may then be grasped and yanked in opposite directions to partially separate film layers.

As used herein, an "adhesive failure" is a failure in which the interfacial forces (e.g., valence forces or interlocking action or both) holding two surfaces together are overcome. A "cohesive failure" is one in which the molecular attractive forces holding together a layer composition are overcome. The interlayer bond strength of the film may be at least about, and/or at most about, any of the following values: 1,000; 1,500; 2,000; 2,500; 3,000; and 3,500 grams (force)/inch.

The interlayer bond strength of the film may be measured before orientation, while the film is relatively thick. This may make the measurement of the interlayer bond strength of the film easier than after orientation of the film, when the film may be much thinner than before orientation.

Appearance Characteristics of the Film

The film may have low haze characteristics. Haze is a measurement of the transmitted light scattered more than 2.5° from the axis of the incident light. Unless otherwise noted, haze is measured against the outside layer of the film. The "outside layer" is the outer layer of the film that is or is intended to be adjacent the space outside of a package comprising the film. (The "inside layer" of a film is the outer layer of the film that is or is intended to be adjacent the space inside of a package comprising the film.) Haze is measured according to the method of ASTM D 1003, which is incorporated herein in its entirety by reference. All references to a "haze" value for a film in this application are by this standard. The haze of the film—measured at a time selected from before the forming step or after the forming step—may be at most about, and/or at least about, any of the following values: 30%, 25%, 20%, 15%, 10%, 8%, 5%, 3, and 2%.

The film may have a gloss (i.e., specular gloss) as measured against the outside layer—measured at a time selected from before the forming step or after the forming step—of at least about, and/or at most about, any of the following values: 40%, 50%, 60%, 63%, 65%, 70%, 75%, 80%, 85%, 90%, and 95%. These percentages represent the ratio of light reflected from the sample to the original amount of light striking the sample at the designated angle. All references to "gloss" values in this application are in accordance with ASTM D 2457 (45° angle), which is incorporated herein in its entirety by reference.

The film may be transparent (at least in the non-printed regions) so that a packaged article may be visible through the film. "Transparent" means that the film transmits incident light with negligible scattering and little absorption, enabling objects (e.g., the packaged article or print) to be seen clearly through the film under typical viewing conditions (i.e., the expected use conditions of the material). The regular transmittance (i.e., clarity) of the film—measured at a time selected from before the forming step or after the forming step—may be at least about, and/or at most about, any of the following values: 40%, 50%, 60%, 65%, 70%, 75%, 80%, 85%, and 90%, measured in accordance with ASTM D1746. All references to "regular transmittance" values in this application are by this standard.

The total luminous transmittance (i.e., total transmittance) of the film—measured at a time selected from before the forming step or after the forming step—may be at least about, and/or at most about, any of the following values: 40%, 50%, 60%, 65%, 70%, 75%, 80%, 85%, and 90%, measured in accordance with ASTM D1003. All references to "total luminous transmittance" values in this application are by this standard.

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173-80 (July 1993), of which pages 173-80 is incorporated herein by reference.

Manufacture of the Film

The film may be manufactured by thermoplastic film-forming processes known in the art. The film may be prepared by extrusion or coextrusion utilizing, for example, a tubular trapped bubble film process, a flat or tube cast film process, or a slit die flat cast film process. The film may also be prepared by applying one or more layers by extrusion coating, adhesive lamination, extrusion lamination, solvent-borne coating, or by latex coating (e.g., spread out and dried on a substrate). A combination of these processes may also be employed. These processes are known to those of skill in the art.

The film may be oriented in either the machine (i.e., longitudinal), the transverse direction, or in both directions (i.e., biaxially oriented), for example, to enhance the strength, optics, and durability of the film. A web or tube of the film may be uniaxially or biaxially oriented by imposing a draw force at a temperature where the film is softened (e.g., above the vicat softening point; see ASTM 1525) and for example at a temperature below the film's melting point. The film may then be quickly cooled to retain the physical properties generated during orientation and to provide a heat-shrink characteristic to the film. The film may be oriented using, for example, a tenter-frame process or a bubble process. The orientation may occur in any of one direction (i.e., the machine or transverse directions) and/or two directions (e.g., the machine and transverse directions) by at least about, and/or at most about, any of the following ratios: 1.5:1, 2:1, 2.5:1, 3:1, 3.5:1, 4:1, 5:1, 6:1, 7:1, 8:1, 9:1, 10:1, 12:1, and 15:1. The film may be stretched by any of these amounts in one direction and another of any of these amounts in another direction.

The film may have a free shrink at 100° C. in one direction (e.g., the machine direction or the transverse direction) and/or in both the machine and transverse directions of at least about, and/or at most about, any of the following: 5%, 7%, 9%, 10%, 12%, 15%, 25%, 30%, 40%, 45%, 50%, 55%, 60%, 70%, 75%, and 80%. The film may have any of the forgoing shrink amounts in the machine and/or transverse directions at any of the following temperatures: 90, 80, 70, 60, 50, and 40° C. For example, the film may have a free shrink at 80° C. in the transverse direction of at least about 60% and a free shrink at 60° C. in the machine direction of at most about 10%. Also, the film may have any combination of the forgoing shrink values at differing temperatures; for example, the film may have a free shrink at 90° C. in at least one direction of at least about 75% and a free shrink at 70° C. in any direction of at most about 5%. The film may be annealed, for example, to decrease the shrink attribute at a selected temperature (e.g., 70° C.).

The film may be annealed or heat-set to slightly or substantially reduce the free shrink of an oriented film, for example to raise the shrink initiation temperature. The film may have less than about any of 3%, 2%, and 1% free shrink in any direction at any of the following temperatures: 65, 60, 55, 50, 45, and 40° C.

The free shrink of the film is determined by measuring the percent dimensional change in a 10 cm×10 cm film specimen when subjected to selected heat (i.e., at a specified temperature exposure) according to ASTM D 2732, which is incorporated herein in its entirety by reference. All references to free shrink in this application are measured according to this standard.

The film may have a printed image applied to it, for example, by any suitable ink printing method, such as rotary screen, gravure, or flexographic techniques. The printed image may be applied to a skin layer. The printed image may be applied as a reverse printed image, for example, applied to the inside layer of the film of a shrink sleeve.

Shrink Sleeve

A shrink sleeve 10 (also known as a shrink sleeve label or a shrink band) may comprise any one of any of the embodiments of the inventive film 12 described herein. (See, e.g., FIGS. 1-2.) The shrink sleeve 10 may be a seamed shrink sleeve (illustrated in FIG. 1), a seamless shrink sleeve, or a roll-fed shrink sleeve (i.e., formed by roll-fed shrink film for wraparound labeling).

A seamed shrink sleeve that comprises the film may be manufactured from a flat configuration of the film, which is seamed into a tube by attaching the film to itself to form a tube having a seam 14 using, for example, an adhesive seam. If the sleeve 10 is to be printed, then the formation of the film into a tube may occur after images have been printed onto the film. The printed image 18 may be applied as a reverse printed image to the inside surface 20. The tube may then be wound onto a core. The roll of tubing may then be unwound from the core and cut to individual lengths to form the individual seamed shrink sleeves. The shrink sleeve may then be placed to surround the item (e.g., container 16) to which the shrink sleeve is to be applied. Heat may then be applied (e.g., by placing the shrink-sleeved item into a heat tunnel using, for example, steam or hot air) so that the heat shrink characteristic of the shrink sleeve is activated and the shrink sleeve shrinks to conform to the shape of the item that the shrink sleeve surrounds, as illustrated in FIG. 2.

A seamless shrink sleeve that comprises the film may be manufactured by extruding the film in a tube configuration having a desired tube configuration. The resulting tube may be printed and cut to desired lengths to form individual shrink sleeves.

A roll-fed shrink sleeve comprising the film may be manufactured by: 1) applying a pick-up adhesive to the leading edge of the film that has been cut into the desired dimensions, 2) adhering the leading edge to a container, 3) moving the container and the film relative each other so that the film surrounds the container, 4) applying an adhesive to the trailing edge of the film, 5) adhering the trailing edge of the film to the container or to the leading edge area of the film, and 6) exposing the shrink sleeve/container to heat to activate the shrink characteristic of the film.

A shrink sleeve comprising the film may be used, for example: 1) as a label applied to an item, 2) as a tamper-evident seal or packaging material (e.g., a tamper-evident neck band), and/or 3) to unitize two or more items (e.g., multi-packing). The shrink sleeve may be a full-body sleeve for enclosing a container. The shrink sleeve may be used to enclose a shaped and/or contoured container (e.g., an asymmetrically-shaped container).

The following examples are presented for the purpose of further illustrating and explaining one or more embodiments of the present invention and are not to be taken as limiting in any regard. Unless otherwise indicated, all parts and percentages are by weight.

In the examples below, these abbreviations have the following meanings:

PETG1 is a glycol-modified poly(ethylene terephthalate) available from Eastman Corporation under the Eastar 6763 trade name, and is believed to have about 34 mole % cyclohexane dimethanol monomer content, about 16 mole % ethylene glycol monomer content, and about 50 mole % terephthalic acid monomer content.

SBS1 is a styrene/butadiene block copolymer purchased from BASF Corporation under the STYROLUX BX 6452 trade name and is believed to have a styrene monomer content of above 50 wt. %, a density of 1.02 g/cc, and a melt flow rate of 13 g/10 minutes under Condition 200/5.0 per ASTM D1238.

SBS2 is a styrene/butadiene block copolymer purchased from BASF Corporation under the STYROLUX BX 2000 trade name and is believed to have a styrene monomer content of above 50 wt. %, a density of 1.02 g/cc, and a melt flow rate of 25 g/10 minutes under Condition 200/5.0 per ASTM D1238.

PS1 is a polystyrene homopolymer purchased from Ineos Corporation under the STYRON 145D trade name and includes 3.3 wt. % mineral oil as a processing aid.

EVA1 is a maleic-anhydride grafted ethylene/vinyl acetate copolymer purchased from Dupont Corporation under the BYNEL 3861 trade name, having a vinyl acetate content of about 25 wt. %.

EVA2 is an ethylene/vinyl acetate copolymer purchased from Lanxess Corporation under the LEVAMELT 500 trade name, having a vinyl acetate content of about 50 wt. %.

SEBS1 is a maleic-anhydride grafted styrene/ethylene-butyleye/styrene block copolymer purchased from Kraton Polymers LLC under the KRATON FG 1924 trade name, having a styrene monomer content of about 13 wt. % styrene and a maleic-anhydride content of about 1 wt. %.

COC1 is a homogeneous ethylene/norbornene copolymer purchased from Ticona Corporation under the Topas 9506X1 trade name, and is believed to have a norbornene monomer content of about 22 mole % and a glass transition temperature of about 33° C.

COC2 is a homogeneous ethylene/norbornene copolymer purchased from Ticona Corporation under the Topas 8007 trade name, and is believed to have a norbornene monomer content of about 35 mole % and a glass transition temperature of about 85° C.

AB1 is a microcrystalline silica antiblock masterbatch available from Eastman Chemical under the CO 235 trade name.

Examples 1-5; Comparisons 1-4

A five-layer Example 1 film was made by extruding a film having an A/C/B/C/A film layer configuration where the "A" skin layers were PETG1, the "B" base layer was a blend of 80 wt. % SBS1 and 20 wt. % PS1, and the "C" intermediate layers were a blend of 95 wt. % EVA1 and 5 wt. % COC1. The film was extruded using a Randcastle cast extruder to have a thickness of about 10 mils. The thickness ratio of the layers was 1:1:6:1:1. The interlayer bond strength of the film was evaluated and is reported in Table 1. To evaluate the interlayer bond strength of the film, three one-inch wide strips (rather than five as set forth in the description herein related to the ASTM F88 procedure) were cut from the film, the layers manually separated on one side of the strip, and the adhesion measured using an Instron Mini55 instrument.

Examples 2-5 films and Compare 1 and 3-4 films were the same as the Example 1 film above, except for the "C" layers, as set forth in Table 1. The Compare 2 film was similar to the Example 1 film above, except that the Compare 2 film was a 3-layer film without "C" layers. The interlayer bond strengths of the films were evaluated and are reported in Table 1.

TABLE 1

| Film | "C" Layer | Interlayer Bond Strength (gmf/inch) |
|---|---|---|
| Example 1 | 95 wt. % EVA1 + 5 wt. % COC1 | 2762 |
| Example 2 | 90 wt. % EVA1 + 10 wt. % COC1 | 2552 |
| Example 3 | 90 wt. % EVA1 + 10 wt. % COC2 | 2886 |
| Compare 1 | 100 wt. % EVA1 | 1163 |
| Compare 2 | no "C" layer | 898 |
| Example 4 | 90 wt. % EVA2 + 10 wt. % COC1 | 1505 |
| Compare 3 | 100 wt. % EVA2 | 633 |
| Example 5 | 90 wt. % SEBS1 + 10 wt. % COC1 | 2082 |
| Compare 4 | 100 wt. % SEBS1 | 1378 |

The data shows the surprisingly improved interlayer bond strength of the Example films resulting from the addition of the COC in the intermediate "C" layer compared to the corresponding Compare films.

Example 6; Comparison 5

A five-layer Example 6 film was made similar to the Example 2 film, except that the "A" layer included 2 wt. % AB1 and the "B" layer used SBS2 instead of SBS1.

A five layer Compare 5 film was made similar to the Compare 1 film, except that the "A" layer included 2 wt. % AB1 and the "B" layer used SBS2 instead of SBS1.

The five-layer films both had A/C/B/C/A layer thicknesses of 11%/12%/54%/12%/11%, as a percentage of total thicknesses.

Before orientation, the Example 6 and Compare 5 films had a thickness of about 10 mils. The films were oriented in the transverse direction by a ratio of 6.3:1 and in the machine direction by a ratio of 1:1 (i.e., no orientation in the machine direction) at an orientation temperature of about 100° C. The films were then quenched to lock in the orientation. The thickness of each of the oriented films was about 1.8 mils.

The haze and clarity of the oriented Example 6 film was 6.8% and 54%, respectively. The haze and clarity of the oriented Compare 5 film were 7.3% and 47%, respectively. The Young's modulus of the oriented Example 5 and the oriented Compare 5 films were 217,000 psi and 209,000 psi, respectively. Table 2 below shows the percent free shrink in the transverse direction (TD) and machine direction (MD) at various temperatures.

TABLE 2

| Temperature (° C.) | Example 6 % Free Shrink (TD) | Example 6 % Free Shrink (MD) | Compare 5 % Free Shrink (TD) | Compare 5 % Free Shrink (MD) |
|---|---|---|---|---|
| 60 | 0 | 0 | 0 | 0 |
| 70 | 4.0 | 1.0 | 5.0 | 1.0 |
| 80 | 31.5 | 1.0 | 31.0 | 1.0 |
| 90 | 60.0 | -4.5 | 61.5 | -5.5 |
| 100 | 71.0 | -4.5 | 74.3 | -5.0 |

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A film comprising:
   a skin layer comprising polyester;
   a base layer comprising styrenic block copolymer having a styrene monomer content of at least about 50 wt. %; and
   an intermediate layer between the skin and base layers and directly adjacent at least one of the skin layer and the base layer, the intermediate layer comprising:
   (i) from about 0.5% to about 20%, based on the weight of the intermediate layer, of ethylene/norbornene copolymer having a norbornene monomer content of from about 18 mole % to about 40 mole %; and
   (ii) one or more polymers selected from ethylene/unsaturated ester copolymer and styrenic block copolymer having a styrene monomer content of at most about 50 wt. %, wherein:
   the film has a free shrink at 100° C. in at least one direction of at least about 10%; and
   the thickness of the intermediate layer is at most about 25% of the total thickness of the film.

2. The film of claim 1 wherein the intermediate layer is directly adjacent the skin layer.

3. The film of claim 1 wherein the intermediate layer is directly adjacent the base layer.

4. The film of claim 1 wherein the intermediate layer is directly adjacent both the skin and base layers.

5. The film of claim 1 wherein the styrenic block copolymer of the base layer comprises styrene/butadiene copolymer.

6. The film of claim 1 wherein the styrenic block copolymer of the base layer comprises styrene/butadiene copolymer modified with unsaturated carboxylic acid anhydride.

7. The film of claim 1 wherein the base layer comprises at least about 50% styrenic block copolymer, based on the weight of the base layer.

8. The film of claim 1 wherein the base layer further comprises from about 0.5% to about 30%, based on the weight of the base layer, of polystyrene having a styrene monomer content of at least about 90 wt. %.

9. The film of claim 1 wherein the skin layer comprises glycol-modified polyester.

10. The film of claim 1 wherein the skin layer comprises at least about 80% glycol-modified polyester, based on the weight of the skin layer.

11. The film of claim 1 wherein the skin layer comprises at least about 80% glycol-modified poly(ethylene terephthalate), based on the weight of the skin layer.

12. The film of claim 1 wherein the intermediate layer comprises at least about 80% by weight of the intermediate layer of the one or more polymers (ii).

13. The film of claim 1 wherein the intermediate layer comprises at least about 60% of polymer selected from ethylene/vinyl acetate copolymer and unsaturated carboxylic acid anhydride modified ethylene/vinyl acetate copolymer, by weight of the intermediate layer.

14. The film of claim 1 wherein the intermediate layer comprises at least about 60% of polymer selected from styrenic block copolymer having a styrene monomer content of at most about 50 wt. % and unsaturated carboxylic acid anhydride modified styrenic block copolymer having a styrene monomer content of at most about 50 wt. %, by weight of the intermediate layer.

15. The film of claim 1 wherein the intermediate layer comprises at least about 60% of polymer selected from styrene/ethylene-butylene/styrene block copolymer and unsaturated carboxylic acid anhydride modified styrene/ethylene-butylene/styrene block copolymer, by weight of the intermediate layer.

16. The film of claim 1 wherein the intermediate layer comprises at least about 60% of polymer selected from ethylene/$C_1$-$C_{12}$ alkyl (meth)acrylate copolymer and unsaturated carboxylic acid anhydride modified ethylene/$C_1$-$C_{12}$ alkyl (meth)acrylate copolymer, by weight of the intermediate layer.

17. The film of claim 1 wherein the Young's modulus of the film is at least about 200,000 psi.

18. The film of claim 1 wherein the free shrink in at least one direction is at least about 40%.

19. A shrink sleeve comprising the film of claim 1.

20. A method of labeling a container comprising:
    placing the shrink sleeve of claim 19 around the container; and
    shrinking the shrink sleeve to conform the shrink sleeve to the container.

21. The film of claim 1 wherein:
    the skin layer is a first skin layer;
    the intermediate layer is a first intermediate layer; and
    the first intermediate layer is between the first skin layer and the base layer; and further comprising:
    a second skin layer comprising polyester; and
    a second intermediate layer between the skin and base layers and directly adjacent at least one of the second skin layer and the base layer, the second intermediate layer comprising:
    (i) from about 0.5% to about 20%, based on the weight of the intermediate layer, of ethylene/norbornene copolymer having a norbornene monomer content of from about 18 mole % to about 40 mole %; and
    (ii) one or more polymers selected from ethylene/unsaturated ester copolymer and styrenic block copolymer having a styrene monomer content of at most about 50 wt. %.

* * * * *